United States Patent Office 3,157,524
Patented Nov. 17, 1964

3,157,524
PREPARATION OF COLLAGEN SPONGE
Charles Artandi, Highland Park, N.J., assignor to Ethicon, Inc., a corporation of New Jersey
No Drawing. Original application Oct. 25, 1960, Ser. No. 64,703. Divided and this application Mar. 13, 1962, Ser. No. 180,930
13 Claims. (Cl. 106—122)

This invention relates to collagen sponges and the preparation thereof. The invention is particularly useful in the preparation of a high density sponge which is valuable for surgical uses.

In surgery, sponges are used to control bleeding through the application of pressure and coagulating material such as thrombin. Collagen sponges have an important advantage in that they may remain in the body cavity since they are non-antigenic and absorbable. The collagen sponges of the present invention are of uniform porosity and will quickly absorb from about 10 to about 70 times their weight in water. The outstanding characteristics of these improved sponges, however, are their high density and strength under compression. The process to be described will result in a collagen sponge that is about three times as dense as those made by other known processes.

Sponge-like collagen masses have been previously prepared by freezing an acid collagen gel and subliming the water under high vacuum while maintaining the temperature below the freezing point. Such a lyophilized sponge contains many open channels throughout the mass of residual collagen fibrils. Sponges obtained in this manner, however, retain the acid used to obtain the collagen gel and, therefore, will revert to their gel-like state when immersed in water. While it is possible to convert the sponge to a water insoluble state by neutralizing and removing the acid complement, such chemical action distorts the rigid sponge structure.

It has now been discovered that if acid-treated swollen collagen fibrils are frozen and then dehydrated with a water-miscible organic solvent containing a neutralizing agent, the acid component is neutralized and the salt so formed removed with the water. The remaining collagen structure is quite porous since the volume of the collagen fibrils is far less than that of the swollen collagen fibrils. However, the simultaneous removal of acid and water minimizes distortion of the fibrillar network and results in a dense sponge-like collagen mass of exceptional uniformity.

The raw materials for the swollen collagen mass to be frozen is preferably tendon. Whales are a large source of collagen and whale tendon is a satisfactory starting material. Pork, beef, and sheep tendon is also satisfactory. These materials are comminuted, washed with water and, if desired, treated with an enzyme solution to remove the elastin which encircles and ties together the native collagen fibers. The collagen is then swollen in an aqueous acid solution.

The choice of the acid employed is not critical since the purpose of the acid is to reduce the pH of the swelling solution to about 2.5–3.5, at which pH the collagen rapidly absorbs water in the swelling of individual collagen fibrils. Inorganic acids such as dilute hydrochloric acid, as well as numerous organic acids such as acetic acid, malonic acid, lactic acid and cyanoacetic acid may be used. In general, the acid concentration need not exceed 1% of the dispersion or 50% of the collagen solids in order to provide the pH suitable for swelling.

The concentration of the collagen solids in the swollen collagen mass may vary from about 0.4% to about 4.0%. Lower concentrations of collagen are costly to dehydrate by my method since a large quantity of water-miscible organic solvent is required to remove the excess water. Higher concentrations of collagen are difficult to homogenize because the viscosity increases rapidly when the collagen concentration exceeds about 2%.

The rate of freezing the swollen collagen mass appears to have a minor effect on the final structure of the sponge. In general, the quickly frozen collagen masses (less than one hour freezing time) after dehydration are more distorted and denser than sponges obtained by freezing overnight at −20° C. in a commercial deep-freeze locker.

Depending upon the end product desired, the swollen collagen can be formed into different shapes prior to freezing. Thus, a porous collagen film is readily obtained by simply pouring swollen collagen (about 1% solids) on a cold surface. Collagen sponges may be produced in any desired thickness and size by freezing the swollen collagen in a stainless steel form of the desired dimensions. Porous collagen tubes may be formed by freezing the swollen collagen in a mold, or alternatively, a flexible rubber tube of the desired size which contains a circulating liquid at about −70° F. can be immersed in the swollen collagen. Under these conditions, the collagen will freeze to the wall of the tube to form a uniform coating which may then be dehydrated prior to removal of the supporting tube.

Any water-miscible solvent that does not react with or dissolve collagen may be used as a dehydrating liquid. Thus, the lower molecular weight alcohols, such as methyl, ethyl, propyl, and isopropyl alcohol may be used as well as water-soluble glycols such as ethylene glycol and ethers such as dioxane. Low molecular ketones such as acetone and methyl ethyl ketone are also suitable. Isopropanol and acetone are particularly preferred.

Any inorganic or organic base that is soluble in the dehydrating solvent may be employed to neutralize the acid present in the swollen collagen structure. While I prefer to employ ammonium hydroxide, low molecular weight primary, secondary and tertiary organic amines such as methylamine which form salts that are soluble in the extracting liquid are also suitable. Inorganic bases such as sodium hydroxide may also be used.

The amount of solvent required to dehydrate the frozen collagen mass is dependent upon the particular solvent used and the volume of the frozen collagen mass. More time is required for the organic solvent system to penetrate the frozen collagen mass in large volume than, for example, a thin frozen collagen film. The concentration of collagen solids is also an important factor. In general, however, the volume of solvent should be about 2 to about 4 times the volume of the frozen collagen mass. It is important to continue the extraction until the residual water remaining behind in the sponge structure is no more than about 1% based upon the weight of the air-dried sponge. If the dehydration step is discontinued without removing substantially all of the water from the mass, the sponge structure will be unstable and distorted. Furthermore, it is convenient to air dry the collagen sponge at elevated temperatures after the solvent-extraction step to remove excess organic solvent. Too large a quantity of residual water remaining in the sponge would damage the sponge during this air-drying step.

As indicated above, the sponges prepared by solvent dehydration are more dense than lyophilized collagen sponges and have a density in the range of 0.015 gram to 0.060 gram per cubic centimeter. This density will vary with the concentration of collagen in the starting material and the concentration and type of acid used to swell the collagen. Thus, if the swollen collagen mass prior to freezing contains about 0.8% by weight of collagen solids, the density of the final sponge may be as low as 0.015 gram per cubic centimeter. If, on the other hand, the collagen mass prior to freezing contains about 3.0% by weight of collagen solids, the density of the extracted sponge may be about 0.060 gram per cubic centimeter.

The sponges of the present invention have the property of elastic memory, that is, if a force is applied sufficient to compress the sponge to approximately one-half of its original volume, the sponge will recover to approximately the original dimensions when the force is removed. Moreover, the force may be applied repeatedly and recovery will take place unless the force is so great that the collagen sponge is compressed to a volume less than about $\frac{1}{10}$ of its original mass. If the force is sufficiently great, about 100–1000 p.s.i., the sponge will remain indefinitely in the compressed state.

These novel collagen sponges may be tanned by treating with formaldehyde, pyrogallol, chromium or other reagents commonly employed in the tanning of collagen. Such tanning may be used to control the in vivo digestion time of the collagen sponge. Thus, an untanned collagen sponge when implanted in animal tissue will lose about 84% of its mass in 10 days. A similar sponge, tanned with about 0.4% of formaldehyde will lose about 73% of its original weight under similar conditions. The tanning agents may be added to the dehydrating bath or to the swollen collagen mass prior to freezing.

The following are specific examples illustrating different methods of carrying out the invention.

Example I

The deep flexor tendon of cattle is cleaned of fat, superficial non-collagenous protein and other extraneous matter and is sliced on an electric meat-slicing machine (rotary knife) in the frozen condition. The tendon sections are sliced perpendicularly to their longitudinal axis to a thickness of about 11 mils. An aliquot sample of the tendon slices is analyzed; the dry solids amount to 36.97%.

The sliced tendon is next treated with an enzyme solution to dissolve elastin. The enzyme solution is prepared by dissolving 0.15 part of ficin and 3.75 parts of ethylene diamine tetrasodium tetraacetate in 750 parts of water. Seventy-five parts of the sliced tendon is immersed in this solution which is stored at room temperature overnight. Then 2.25 parts of 30% hydrogen peroxide is added to destroy any residual ficin.

To this mixture of tendon slices in about 750 parts of water is added an additional 2244 parts of water and 5.87 parts of cyanoacetic acid. The swelling solution is cooled to below 25° C. This mixture is stirred in a dispersion kettle at about 60 r.p.m. The remaining steps in the process are carried out at temperatures below about 25° C. and the temperature of the collagen dispersion is not allowed to exceed this temperature.

Stirring is continued for about 3 hours, during which time the individual collagen slices are swollen. The dispersion is then homogenized by repeated passes through series-connected jets having orifices of 50 mils and 40 mils, respectively. The dispersion is then forced through a leaf filter containing three screens of #316 stainless steel. These screens are separated by ⅛-inch spacers and decrease in mesh size so that the dispersion first passes a 14-mil screen, then a 9-mil screen, and finally a 4-mil screen. The dispersion of solvated collagen fibrils so obtained analyzes 1.09% solids and has a pH of 2.52.

The above collagen dispersion is poured into stainless steel forms and frozen in sub-zero cabinet at −20° C. overnight. The frozen blocks are then removed from the container and immersed in a circulating bath containing 12 liters of 99% isopropanol and 25 milliliters of concentrated ammonium hydroxide at room temperature. After approximately four hours, the isopropanol solution is replaced with 12 liters of a fresh solution and the dehydration is continued overnight at room temperature. The isopropanol solution containing the water extracted is removed and a third bath of 99% isopropanol is used in the further dehydration of the collagen. The third bath is replaced in turn with a fourth bath having the same composition; the dehydrating time amounting to 6 to 8 hours in both the third and fourth baths. At this time, the collagen sponges are practically free of water and may be air dried in an oven at 45° C. overnight without damage.

The density of this sponge is 0.045 gram per cubic centimeter. A piece of this sponge measuring 1½″ x 1½″ x 1″ is compressed to ½-inch thickness. The force required is 15 to 16 pounds and when the force is removed, the sponge regains 90 to 100% of its original volume in a few minutes. On repeated compressions to ½-inch thickness, the same force (about 15 pounds) is required.

Example II

A collagen dispersion is prepared according to the general procedure described in Example I above from 391 parts of sliced beef leg tendon and 17,110 parts of distilled water containing 7.3 parts of glacial acetic acid. This dispersion contains 0.8% solids and is frozen in trays and transferred in the frozen condition to a wire mesh frame. The frozen mass is rehydrated and coagulated by immersing in a circulating bath containing 60,000 parts of 99% isopropanol and 120 parts of concentrated ammonium hydroxide at room temperature for approximately 8 hours. The circulating isopropanol bath is then replaced with a freshly constituted bath and the dehydration is continued overnight. This second bath is replaced with a third bath containing 99% isopropanol at room temperature and the dehydration is continued for 8 to 16 hours after which a fourth bath consisting of 99% isopropanol is substituted for the third bath. After dehydration for 8 to 16 hours in the fourth bath, resulting sponges are air-dried at 50° C. overnight. The density of this sponge is 0.017 gram per cubic centimeter.

Example III

Example II above was repeated, substituting for the 7.3 parts of glacial acetic acid employed in that example 59.5 parts of cyanoacetic acid. The sponge so obtained, after air-drying at 50° C. overnight has a density of 0.043 gram per cubic centimeter.

Example IV

A collagen dispersion is prepared according to the general procedure described in Example I above from 216 parts of sliced beef leg tendon and 9,780 parts of distilled water containing 50 parts of malonic acid. This dispersion contains 0.8% solids and is frozen in trays and transferred in the frozen condition to a wire mesh frame. The frozen mass is dehydrated and coagulated by immersing in a circulating bath containing 45,000 parts of 99% isopropanol and 1330 parts of concentrated ammonium hydroxide at room temperature for approximately 8 hours. The circulating isopropanol bath is then replaced with a freshly constituted bath and the dehydration is continued overnight. This second bath is replaced with a third bath containing 99% isopropanol at room temperature and the dehydration is continued for 8 to 16 hours after which a fourth bath consisting of 99% isopropanol is substituted for the third bath. After dehydration in the fourth bath for 8 to 16 hours, resulting sponges are air-dried at 50° C. overnight. The density of this sponge is 0.037 gram per cubic centimeter.

Example V

A collagen dispersion is prepared according to the general procedure described in Example I above from 391 parts of sliced beef leg tendon and 17,110 parts of distilled water containing 18.5 parts of lactic acid (85%). This dispersion contains 0.8% solids and is frozen in trays and transferred in the frozen condition to a wire mesh frame. The frozen mass is dehydrated and coagulated by immersing in a circulating bath containing 60,000 parts of 99% isopropanol and 120 parts of concentrated ammonium hydroxide, for approximately 8 hours at room temperature. The circulating bath is then replaced with a freshly constituted bath and the dehydration is continued overnight. The second dehydrating bath is replaced with baths numbers 3, 4 and 5, each containing 99% isopropanol and the collagen is permitted to dehydrate in each of these baths for 8 to 24 hours. The sponges are air-dried at 50° C. overnight. The density of this sponge is 0.040 gram per cubic centimeter.

*Example VI*

A collagen dispersion is prepared according to the general procedure described in Example I above from 1173 parts of sliced beef leg tendon and 17,110 parts of distilled water containing 7.3 parts of glacial acetic acid. This dispersion contains 2.4% solids and is frozen in trays and transferred in the frozen condition to a wire mesh frame. The frozen mass is dehydrated and coagulated by immersing in a circulating bath containing 60,000 parts of 99% isopropanol and 120 parts of concentrated ammonium hydroxide at room temperature for approximately 8 hours. The circulating isopropanol bath is then replaced with a freshly constituted bath and the dehydration is continued overnight. This second bath is replaced with a third bath containing 99% isopropanol at room temperature and the dehydration is continued for 8 to 16 hours after which a fourth bath consisting of 99% isopropanol is substituted for the third bath. After dehydration for 8 to 16 hours, the resulting sponge is air-dried at 60° C. overnight. The density of this sponge is 0.052 gram per cubic centimeter.

*Example VII*

A collagen dispersion is prepared according to the general procedure described in Example I above from 391 parts of sliced beef leg tendon and 17,110 parts of distilled water containing 7.3 parts of glacial acetic acid. This dispersion contains 0.8% solids and is frozen in trays and transferred in the frozen condition to a wire mesh frame. The frozen mass is dehydrated and coagulated by immersing in a circulating bath containing 60,000 parts of acetone and 56 parts of concentrated ammonium hydroxide at room temperature for approximately 8 hours. The circulating acetone bath is then replaced with a freshly constituted bath and the dehydration is continued overnight. This second bath is replaced with a third bath containing acetone at room temperature and the dehydration is continued overnight. This second bath is replaced with a third bath containing acetone at room temperature and the dehydration is continued for 8 to 16 hours after which a fourth bath consisting of acetone is substituted for the third bath. After dehydration for 8 to 16 hours in the fourth bath, resulting sponges are air-dried at 50° C. overnight. The density of this sponge is 0.027 gram per cubic centimeter.

*Example VIII*

A collagen dispersion is prepared according to the general procedure described in Example I above from 391 parts of sliced beef leg tendon and 17,110 parts of distilled water containing 59.5 parts of cyanoacetic acid. This dispersion contains 0.8% solids and is frozen in trays and transferred in the frozen condition to a wire mesh frame. The frozen mass is dehydrated and coagulated by immersing in a circulating bath containing 60,000 parts of 99% isopropanol and 1860 parts of concentrated ammonium hydroxide and 50 parts of formaldehyde (37% solution) for approximately 8 hours. This bath is replaced with 99% isopropanol and the solvent dehydration is continued overnight. Finally, the second bath is replaced with baths numbers 3 and 4 each containing 99% isopropanol, dehydrating 8 to 16 hours in each bath. The sponges after air-drying overnight at 50° C. have a density of 0.034 gram per cubic centimeter.

*Example IX*

A dispersion of collagen fibrils (0.7% collagen) is prepared by treating 320 parts of washed sliced beef leg tendon with 3000 parts of distilled water containing 1.16 parts of ethylene diamine disodium acetate and 0.6 part of ficin overnight. The pH is adjusted to 6–7 with ammonium hydroxide, the supernatant liquor is decanted and the tendon slices are washed several times. To the washed collagen slices is added 100 parts of 3% hydrogen peroxide and the mixture is stirred for 10 minutes and washed thoroughly. Enzyme-treated collagen slices are swollen in 16,000 parts of distilled water containing 9 parts of glacial acetic acid and stored overnight under refrigeration.

To 800 parts of the dispersion of swollen collagen fibrils is added 8 parts of an alkyl phenoxy polyethoxy ethanol, 4 parts of formaldehyde (37% solution) and 24 parts of concentrated ammonium hydroxide. This mixture is homogenized, transferred to a tray and frozen. The frozen mass is immersed in 5000 parts of 99% isopropanol for 24 hours. This bath is replaced with fresh 99% isopropanol and this mass is dehydrated for another 24 hours. The second bath is replaced with bath number 3 and bath number 4, each containing 99% isopropanol and the material is dehydrated for 24 hours in each of these baths. Finally, the sponge is air-dried at 40° C. overnight.

*Example X*

A collagen dispersion is prepared from 391 parts of sliced beef leg tendon, 17,110 parts of distilled water and 59.5 parts of cyanoacetic acid. The mixture is stirred and permitted to swell under refrigeration overnight, after which it is homogenized in a colloid mill (Charlotte Model ND-1).

Six hundred grams of the homogenized dispersion is poured into a tray 15 inches long, 9 inches wide and 1½ inches in depth and smoothed out with a spatula. The tray is placed in a freezer overnight at −20° C. The frozen cake is coagulated and dehydrated by the method described in Example I. After the collagen mass has been dehydrated in the fourth isopropanol dehydrating bath, it is removed from the tray and squeezed repeatedly between rubber rollers and dried. The pressure exerted by the rubber rollers on the collagen film amounts to about 128 pounds per square inch and the density of the dried film is 0.05 gram per cubic centimeter. Collagen films prepared in a similar manner have densities in the range of from about 0.03 to 0.08 gram per cubic centimeter.

*Example XI*

A dispersion of swollen collagen fibrils (0.08% collagen in 0.05 N acetic acid) is poured into a ¾ inch I.D. glass tube through which a 5/16 inch glass rod is placed. Before inserting the glass rod, it is covered with a black rubber tube to provide a more resilient form on which to mold the inside of the collagen tube. The glass rod is held in place by a rubber bushing at one end of the glass tube. This mold with the dispersion in place is then frozen in the vertical position for at least four hours at −20° C.

The mold is then placed in a static coagulation bath consisting of 2 liters of isopropanol alcohol, 30 cubic centimeters of concentrated ammonia (25%) and 10 cubic centimeters of formaldehyde (37% solution) at room temperature and the mold is maintained in the solution for 16 hours. The glass rod covered with the rubber tube and the formed collagen tube is then removed and placed in a dehydrating bath consisting of 2 liters of isopropanol alcohol. The collagen tube is left in this bath for an additional 16 hours to complete the dehydration.

After dehydration, the rubber tube with the collagen tube on it, is very carefully slid off the glass rod and the rubber tube is removed from the interior of the collagen tube by pulling on both ends of the rubber tube, thereby stretching the rubber tube and reducing its diameter. After the collagen tube is removed from the rubber tubing, it is plasticized in a bath consisting of 2 liters of 90% isopropanol alcohol (10% water) containing 5% glycerine. This plasticizing operation is optional. After 24 hours in the plasticizing bath, the collagen tube is supported on a glass rod and air-dried.

In the foregoing description and examples, the specific steps for preparing a collagen sponge by dehydrating a frozen swollen collagen mass with organic solvents has been described in some detail, and it will be understood that such details may vary widely without departing from the spirit of the invention.

The present application is a division of my co-pending application No. 64,703, filed October 25, 1960, and now abandoned.

What is claimed is:

1. A method of making a collagen sponge having interconnected pores throughout, which comprises freezing an aqueous acid dispersion of collagen fibers, immersing the frozen mass in a water miscible organic solvent containing sufficient base to neutralize the acid present in said dispersion, whereby the collagen fibers are dehydrated and coagulated, and drying the resulting collagen mass to form a collagen sponge.

2. A method of making a collagen sponge having interconnected pores throughout, which comprises freezing a mass of acid swollen collagen fibrils containing 0.5% to 4.0% by weight collagen fibrils, immersing the frozen mass into a water miscible organic solvent containing sufficient base to neutralize the acid present in said dispersion whereby the collagen fibers are dehydrated and coagulated, and drying the resulting collagen mass to form a collagen sponge.

3. A method of making a collagen sponge having interconnected pores throughout, which comprises freezing an acetic acid dispersion of collagen fibers and immersing the frozen mass in acetone containing sufficient base to neutralize the acid present in said dispersion whereby the collagen fibers are dehydrated and coagulated, and drying the resulting collagen mass to form a collagen sponge.

4. A method of making a collagen sponge having interconnected pores throughout, which comprises freezing an aqueous acid dispersion of collagen fibers and immersing the frozen mass in isopropanol containing sufficient base to neutralize the acid present in said dispersion whereby the collagen fibers are dehydrated and coagulated, and drying the resulting collagen mass to form a collagen sponge.

5. A method of making a collagen sponge having interconnected pores throughout, which comprises freezing an aqueous acid dispersion of collagen fibers and immersing the frozen mass in isopropanol containing sufficient ammonium hydroxide to neutralize the acid present in said dispersion whereby the collagen fibers are dehydrated and coagulated, and drying the resulting collagen mass to form a collagen sponge.

6. A method of making a collagen sponge having interconnected pores throughout, which comprises freezing an aqueous acid dispersion of collagen fibers and immersing the frozen mass in acetone containing sufficient ammonium hydroxide to neutralize the acid present in said dispersion whereby the collagen fibers are dehydrated and coagulated, and drying the resulting collagen mass to form a collagen sponge.

7. A method of making a collagen sponge having interconnected pores throughout, which comprises freezing an aqueous acid dispersion of tendon collagen fibers, immersing the frozen mass in a water-miscible organic solvent containing sufficient base to neutralize the acid present in said dispersion, whereby the tendon collagen fibers are dehydrated and coagulated, and drying the resulting collagen mass to form a collagen sponge.

8. A method of making a collagen sponge having interconnected pores throughout, which comprises freezing an aqueous acid dispersion of collagen fibers, immersing the frozen mass in a water-miscible organic solvent containing sufficient base to neutralize the acid present in said dispersion, whereby the collagen fibers are dehydrated and coagulated, and drying the resulting collagen mass to form a collagen sponge.

9. A method of making a collagen sponge having interconnected pores throughout, which comprises freezing an aqueous lactic acid dispersion of collagen fibers, immersing the frozen mass in a water-miscible organic solvent containing sufficient base to neutralize the acid present in said dispersion, whereby the collagen fibers are dehydrated and coagulated, and drying the resulting collagen mass to form a collagen sponge.

10. A method of making a collagen sponge having interconnected pores throughout, which comprises freezing a cyanoacetic acid dispersion of collagen fibers, immersing the frozen mass in a water-miscible organic solvent containing sufficient base to neutralize the acid present in said dispersion, whereby the collagen fibers are dehydrated and coagulated, and drying the resulting collagen mass to form a collagen sponge.

11. A method of making a collagen sponge having interconnected pores throughout, which comprises freezing an aqueous lactic acid dispersion of about 1% by weight collagen fibers, immersing the frozen mass in a water-miscible organic solvent containing sufficient ammonium hydroxide to neutralize the acid present in said dispersion whereby the collagen fibers are dehydrated and coagulated, and drying the resulting collagen mass to form a collagen sponge.

12. A method of making a collagen sponge having interconnected pores throughout, which comprises freezing an aqueous lactic acid dispersion of about 1% by weight tendon collagen fibers, immersing the frozen mass in a water-miscible organic solvent containing sufficient ammonium hydroxide to neutralize the acid present in said dispersion whereby the tendon collagen fibers are dehydrated and coagulated, and drying the resulting collagen mass to form a collagen sponge.

13. A method of making a collagen film having interconnected pores throughout, which comprises freezing an aqueous acid dispersion of about 1% by weight collagen fibers, immersing the frozen mass in a water-miscible organic solvent containing sufficient ammonium hydroxide to neutralize the acid present in said dispersion whereby the collagen fibers are dehydrated and coagulated, compressing the collagen fibers under a roller and drying the resulting collagen mass to form a collagen film.

References Cited in the file of this patent

UNITED STATES PATENTS

| | | |
|---|---|---|
| 2,610,625 | Sifferd et al. | Sept. 16, 1952 |
| 2,838,363 | Veis | June 10, 1958 |
| 3,071,483 | Tu | Jan. 1, 1963 |

UNITED STATES PATENT OFFICE
CERTIFICATE OF CORRECTION

Patent No. 3,157,524                                      November 17, 1964

Charles Artandi

It is hereby certified that error appears in the above numbered patent requiring correction and that the said Letters Patent should read as corrected below.

Column 4, line 22, for "rehydrated" read -- dehydrated --; column 6, lines 20 and 21, for "isopropanal" read -- isopropanol --; column 7, line 30, for "immensing" read -- immersing --.

Signed and sealed this 13th day of April 1965.

(SEAL)
Attest:

ERNEST W. SWIDER                                    EDWARD J. BRENNER
Attesting Officer                                         Commissioner of Patents